US012410801B2

(12) United States Patent
Davis

(10) Patent No.: US 12,410,801 B2
(45) Date of Patent: Sep. 9, 2025

(54) VARIABLE FREQUENCY DRIVE (VFD) CONTROLLERS WITH ENGINE FAILOVER AND SYSTEMS INCLUDING THE SAME

(71) Applicant: Cattron North America, Inc., Warren, OH (US)

(72) Inventor: Brett Allen Davis, Roswell, GA (US)

(73) Assignee: Cattron North America, Inc., Warren, OH (US)

( * ) Notice: Subject to any disclaimer, the term of this patent is extended or adjusted under 35 U.S.C. 154(b) by 324 days.

(21) Appl. No.: 18/204,071

(22) Filed: May 31, 2023

(65) Prior Publication Data

US 2023/0392602 A1 Dec. 7, 2023

Related U.S. Application Data

(60) Provisional application No. 63/347,791, filed on Jun. 1, 2022.

(51) Int. Cl.
*F04D 15/00* (2006.01)
*F04D 13/02* (2006.01)
(Continued)

(52) U.S. Cl.
CPC ......... *F04D 15/0077* (2013.01); *F04D 13/02* (2013.01); *F04D 13/06* (2013.01); (Continued)

(58) Field of Classification Search
CPC .......... F04B 17/03; F04B 49/02; F04B 49/06; F04B 23/04; F04B 49/065; F04B 51/00; F04B 49/00; F04D 13/06; F04D 13/12; F04D 13/02; F04D 15/0066; F04D 15/029; F04D 15/0088; F04D 15/0254; F04D 15/0281; F04D 25/06; F04D 27/004; F04D 15/0077
See application file for complete search history.

(56) References Cited

U.S. PATENT DOCUMENTS 8,774,972 B2 7/2014 Rusnak et al.
10,753,165 B1 * 8/2020 Fischer .................. F04D 13/02
(Continued)

FOREIGN PATENT DOCUMENTS

DE 112018005839 T5 7/2020

OTHER PUBLICATIONS

Cattron CANplus™ CP1000; cattron.com; Oct. 2021; 3 pages.
(Continued)

*Primary Examiner* — Dominick L Plakkoottam
(74) *Attorney, Agent, or Firm* — Harness, Dickey & Pierce, P.L.C.; Anthony G. Fussner

(57) ABSTRACT

Exemplary embodiments are disclosed of variable frequency drive (VFD) controllers with engine fail-over and systems including the same. In exemplary embodiments, a system includes a controller configured to be operable for controlling a VFD that drives a motor (e.g., a three-phase AC motor, etc.), which, in turn, drives (e.g., mechanically spins, etc.) a first pump. The same controller is also configured to be operable for controlling an engine (e.g., a diesel engine, etc.), which, in turn, drives (e.g., mechanically spins, etc.) a second pump. The system is configured to failover from the motor to the engine in response to a VFD communications failure.

22 Claims, 5 Drawing Sheets

(51) Int. Cl.
*F04D 13/06* (2006.01)
*F04D 13/12* (2006.01)
*F04D 15/02* (2006.01)

(52) U.S. Cl.
CPC ......... *F04D 13/12* (2013.01); *F04D 15/0281* (2013.01); *F04D 15/029* (2013.01); *F05D 2270/05* (2013.01); *F05D 2270/091* (2013.01)

(56) References Cited

U.S. PATENT DOCUMENTS

| | | | | |
|---|---|---|---|---|
| 10,876,358 | B2 | 12/2020 | Fischer et al. | |
| 10,914,155 | B2 | 2/2021 | Oehring et al. | |
| 11,286,736 | B2 | 3/2022 | Fischer et al. | |
| 2001/0041139 | A1* | 11/2001 | Sabini | F04D 15/0066 417/18 |
| 2012/0213643 | A1* | 8/2012 | Naqvi | F16H 61/0031 417/1 |
| 2013/0343911 | A1* | 12/2013 | Stephens | F04B 49/08 417/44.1 |
| 2018/0026566 | A1* | 1/2018 | Stewart | H02P 25/02 290/45 |
| 2019/0145371 | A1* | 5/2019 | Schnellinger | F24D 11/00 290/31 |
| 2019/0316447 | A1* | 10/2019 | Oehring | E21B 43/2607 |
| 2020/0153348 | A1* | 5/2020 | Woodley | H02M 1/32 |
| 2020/0370988 | A1* | 11/2020 | Rogers | F04B 15/02 |
| 2021/0341054 | A1* | 11/2021 | Murota | F16H 61/0202 |
| 2022/0063596 | A1* | 3/2022 | Nishiu | F16H 61/0021 |
| 2022/0065242 | A1* | 3/2022 | Netecke | F04B 53/006 |
| 2022/0126912 | A1* | 4/2022 | Uchida | B62D 5/30 |
| 2022/0233993 | A1* | 7/2022 | Rosinski | B01D 53/0476 |
| 2023/0029138 | A1* | 1/2023 | Koch | F04B 17/03 |
| 2023/0072590 | A1* | 3/2023 | Smith | F02C 7/236 |

OTHER PUBLICATIONS

Programmable logic controller; “https://en.wikipedia.org/w/index.php?title=Programmable_logic_controller&oldid=1089959357” May 26, 2022; 14 pages.

VFD Controller Image; accessed May 27, 2022; 3 pages.

* cited by examiner

VARIABLE FREQUENCY DRIVE (VFD) CONTROLLERS WITH ENGINE FAILOVER AND SYSTEMS INCLUDING THE SAME

CROSS-REFERENCE TO RELATED APPLICATION

This application claims the benefit of and priority to U.S. Provisional Patent Application Ser. No. 63/347,791 filed Jun. 1, 2022. The entire disclosure of this provisional patent application is incorporated herein by reference.

FIELD

The present disclosure generally relates to variable frequency drive (VFD) controllers with engine fail-over and systems including the same.

BACKGROUND

This section provides background information related to the present disclosure which is not necessarily prior art.

FIG. 1 illustrates a conventional pumping system 1 including a first pump 5 and a second pump 9. A three-phase AC motor 13 mechanically spins the first pump 5 as indicated by the arrow. A diesel engine 17 mechanically spins the second pump 9 as indicated by the arrow.

A variable frequency drive (VFD) 21 enables speed control for the three-phase AC motor 13. More specifically, the VFD 21 is operable for manipulating the frequency of the output by rectifying an incoming AC current into DC, and then using voltage pulse-width modulation (PWM) to recreate an AC current and voltage output waveform.

The system 1 further includes a programmable logic controller (PLC) 25 and an engine controller 29. The PLC 25 is operable for controlling the VFD 21 via ModBus data communications protocol. The engine controller 29 is operable for controlling the diesel engine 17 by sending commands to the diesel engine's electronic control unit (ECU) via a controller area network (CAN bus).

The PLC 25 is in communication with a first set of sensors 33. In response to output from the sensors 33 communicated to the PLC 25, the PLC 25 may control operation of the first pump 5 by sending commands to the VFD 21 for controllably changing the speed of the three-phase AC motor 13 driving the first pump 5.

The engine controller 29 is in communication with a second set of sensors 37. In response to output from the second set of sensors 37 communicated to the engine controller 29, the engine controller 29 may control operation of the second pump 9 by sending commands to the diesel engine's electronic control unit (ECU) for controllably changing the speed of the diesel engine 17 that is driving the second pump 9.

DRAWINGS

The drawings described herein are for illustrative purposes only of selected embodiments and not all possible implementations and are not intended to limit the scope of the present disclosure.

Corresponding reference numerals may indicate corresponding (though not necessarily identical) parts throughout the several views of the drawings.

DETAILED DESCRIPTION

Figure 1:
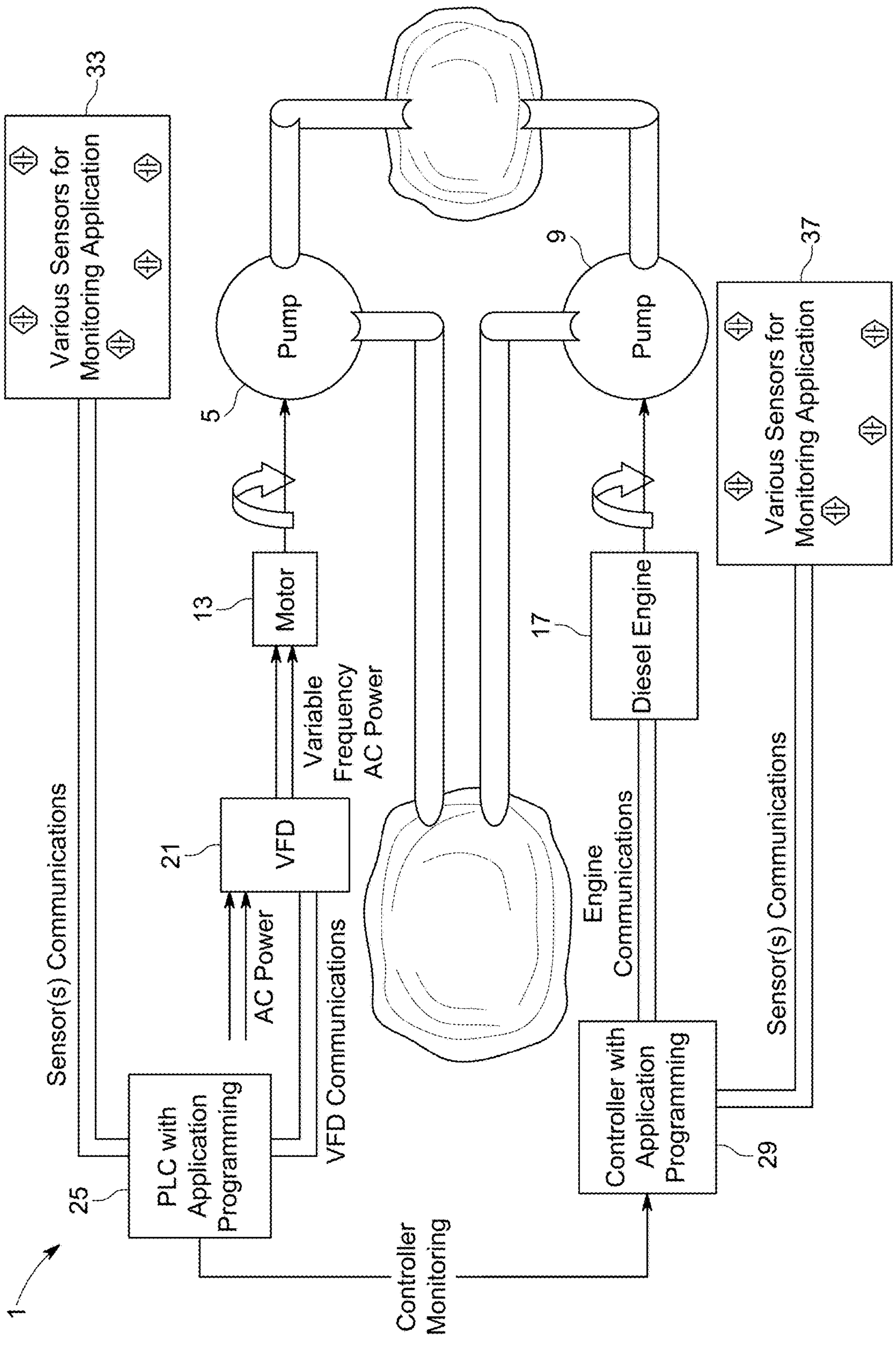
FIG. 1 (Prior Art)
FIG. 1 illustrates a conventional pumping system that includes two different controllers (and associated application programming) for respectively controlling first and second pumps based on or in response to sensor output from different first and second sets of sensors, respectively.

Example embodiments will now be described more fully with reference to the accompanying drawings.

Disclosed herein are exemplary embodiments of variable frequency drive (VFD) controllers with engine fail-over. In exemplary embodiments, a system includes a controller configured to be operable for controlling a variable frequency drive (VFD) and an engine, e.g., in response to or based on the controller's own communications and received sensor output from a single set of sensors or sensor array (e.g., flow sensor(s), suction and/or discharge pressure sensors, tank level sensor(s) at source tank(s) and/or output tank(s), etc.) in communication with the controller, etc.

The controller is configured to be operable for controlling the VFD that drives a motor (e.g., a three-phase AC motor, etc.), which, in turn, drives (e.g., mechanically spins, etc.) a first pump. The same controller is also configured to be operable for controlling an engine (e.g., a diesel engine, etc.), which, in turn, drives (e.g., mechanically spins, etc.) a second pump. The same controller is also configured to be operable to failover (e.g., automatically, substantially instantaneously, with low latency changeover, etc.) from the motor to the engine in response to a VFD communications failure, e.g., power blackout, power brownout, VFD failure, AC motor failure, AC motor pump failure, etc. For example, the controller may failover from the motor to the engine when the VFD stops communicating with the controller, such as when power to the VFD is lost, when there is a hardware and/or software failure that causes the VFD to stop communicating with the controller, etc.

In exemplary embodiments, the VFD is configured to allow the controller to monitor or access other information, such as the amount of power being consumed by the three-phase AC motor or other motor driving the first pump. If the three-phase AC motor fails, the power consumption will go to zero. In this example, the controller is configured to monitor the consumed motor power. If the consumed motor power falls to zero, the controller is configured to fail over (e.g., automatically, substantially instantaneously, with low latency changeover, etc.) to the engine.

If the pump that is mechanically rotated by the three-phase AC motor or other motor seizes up, the motor's RPM will fall to zero and the consumed motor power will increase to a very high level. In this example, the controller is configured to monitor the consumed motor power. If the consumed motor power reaches or exceeds a predetermined maximum threshold and the motor's RPM reaches or falls below a predetermined minimum threshold, the controller is configured to fail over (e.g., automatically, substantially instantaneously, with low latency changeover, etc.) to the engine.

In exemplary embodiments, a single controller may be configured (e.g., programmed, provided with software, etc.) for instructing both the VFD and the engine to start, stop, speed up, and slow down. Advantageously, exemplary embodiments disclosed herein may therefore include a single controller and single set of sensors for controlling operation of the VFD and engine instead of having two different controllers, two different sets of sensors, and two different programs for the respective VFD and engine. For example, FIG. 3 illustrates various components (e.g., PLC 25 and its programming and sensors 33) that may be eliminated from the conventional system 1 shown in FIG. 1 as compared to the exemplary embodiment of the system 100 shown in FIG. 2, which includes a single controller 104 configured to be operable for controlling a VFD 108 and an engine 112.

Figure 2:
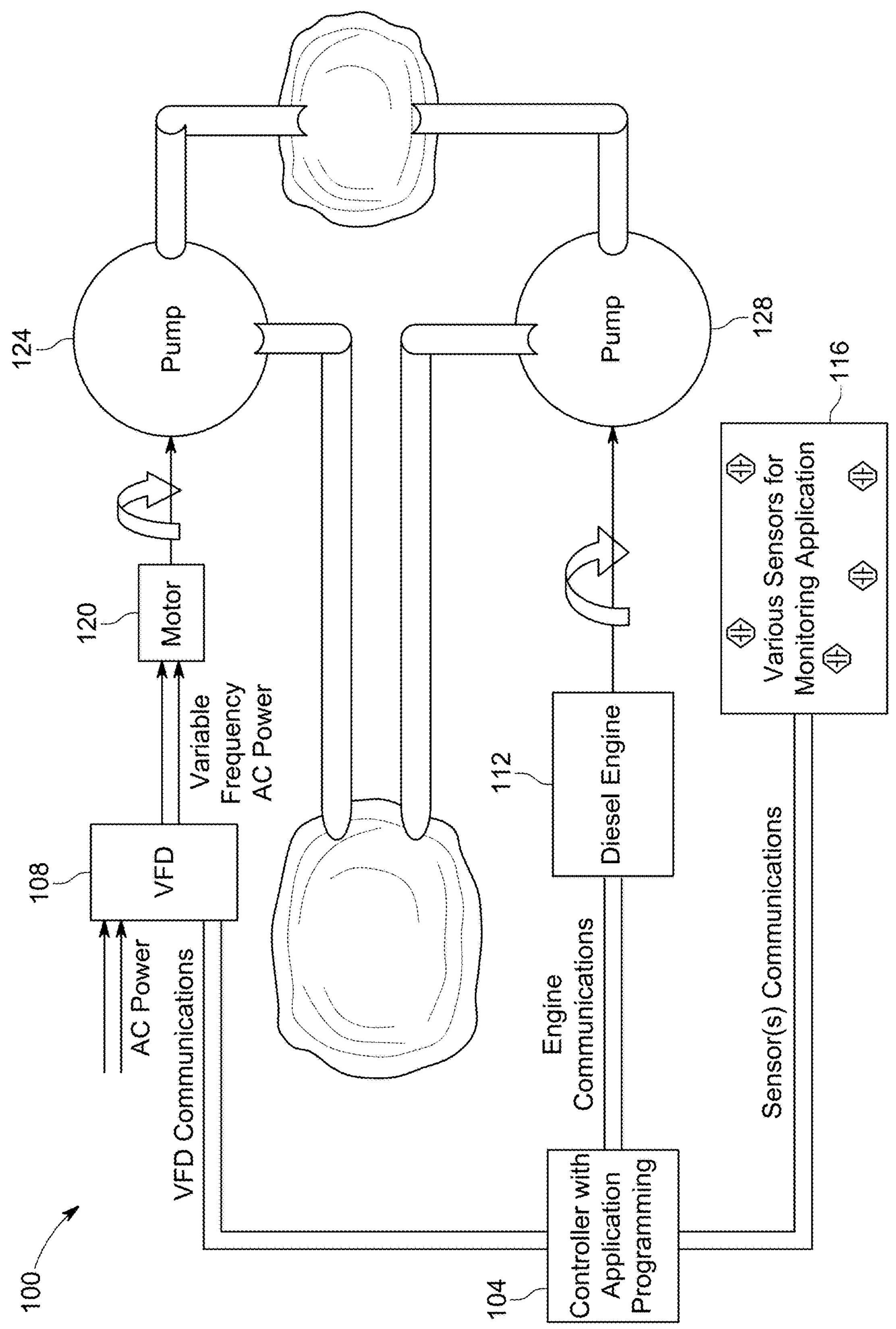
FIG. 2 illustrates an exemplary embodiment of a system including a single controller configured to be operable for controlling a variable frequency drive (VFD) and an engine, e.g., in response to or based on the controller's own communications with sensors, the VFD, and the engine, etc. The system is configured to failover from a motor to the engine in response to a VFD communications failure.
Figure 3:
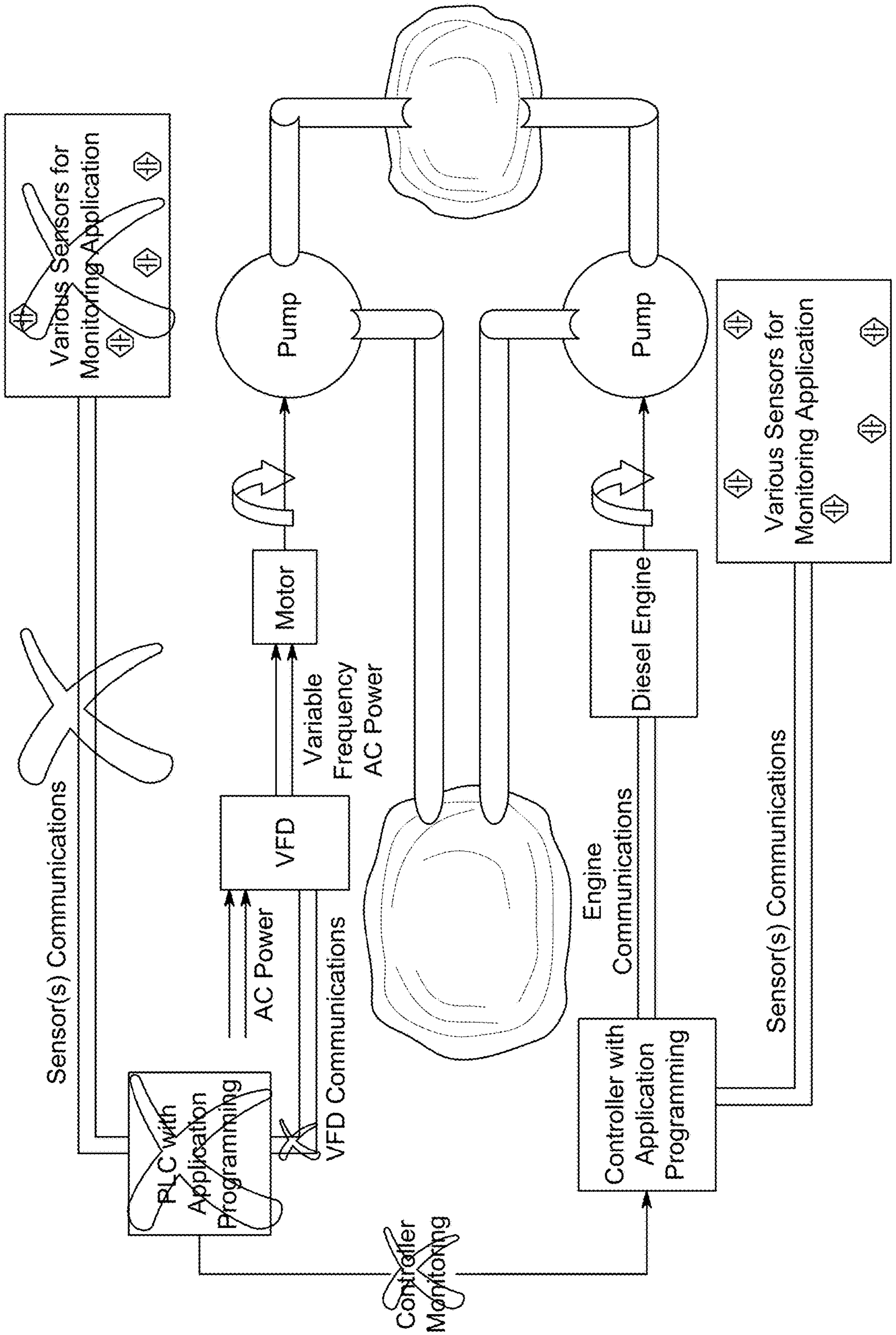
FIG. 3 illustrates various components (e.g., PLC 25 and its programming and sensors 33) that may be eliminated from the conventional system shown in FIG. 1 as compared to the exemplary embodiment of the system shown in FIG. 2, which includes a single controller configured to be operable for controlling the VFD itself and the engine.

FIG. 2 illustrates an exemplary embodiment of a system 100 including a single controller 104 embodying one or more aspects of the present disclosure. The controller 104 is configured to be operable for controlling a variable frequency drive (VFD) 108 and an engine 112, e.g., in response to or based on the controller's own communications and received sensor output from one or more sensors 116 (e.g., flow sensor(s), suction and/or discharge pressure sensors, tank level sensor(s) at source tank(s) and/or output tank(s), etc.) in communication with the controller 104, etc.

The same single controller 104 is configured for controlling operation of the VFD 108 itself, e.g., via ModBus data communications protocol, etc. In turn, the VFD 108 enables speed control of a three-phase AC motor 120 (broadly, a motor) that drives (e.g., mechanically spins, etc.) a first pump 124. The VFD 108 is operable for manipulating the frequency of the output by rectifying an incoming AC current into DC, and then using voltage pulse-width modulation (PWM) to recreate an AC current and voltage output waveform.

A communication link (e.g., hard wired connection, wireless connection, etc.) is provided from the controller 104 to the VFD 108. For example, a single cable or other suitable communication link may be provided from the controller 104 to the VFD 108. The controller 104 is configured to be operable for monitoring the one or more sensors 116. In response to the sensor output (e.g., received via a hard wired connection, wireless connection, etc.), the controller 104 is configured to be operable controlling the VFD 108, e.g., to start, vary the RPMs (revolutions per minute), and stop the motor 120 based on the configured behavior, etc.

The same single controller 104 is also configured for controlling operation of the diesel engine 112 (broadly, an engine) that drives (e.g., mechanically spins, etc.) a second pump 128. For example, the controller 104 may send commands to the diesel engine's electronic control unit (ECU) via a controller area network (CAN bus).

In this exemplary embodiment, the controller 104 is also configured to be operable to failover (e.g., automatically, substantially instantaneously, with low latency changeover, etc.) from the motor 120 to the engine 112 in response to a VFD communications failure, e.g., power blackout, power brownout, VFD failure, AC motor failure, AC motor pump failure, etc. For example, the controller 104 will failover from the motor 120 to the engine 116 when the VFD 108 stops communicating with the controller 104, such as when power to the VFD 108 is lost, when there is a hardware and/or software failure that causes the VFD 108 to stop communicating with the controller 104, etc.

The controller 104 is configured (e.g., algorithmically configured via an algorithm, provided with application programming or software, etc.) to failover from the motor 120 to the engine 116, such that the engine 112 will pick up and continue operation (e.g., continuous seamless operation, etc.) in response to a VFD communications failure. The controller 104 will thereafter continue to control the engine 112 based on the configured behavior until VFD communications have been restored. Preferably, the controller 104 is configured to failover from the motor 120 to the engine 112 automatically when there is a VFD communications failure and without any manual intervention required by a human operator. The failover from the motor 120 to the engine 112 preferably happens substantially instantaneously such that there is a low latency changeover from the motor 120 to the engine 112.

FIG. 3 illustrates various components (e.g., PLC 25 and its programming and sensors 33) that may be eliminated from the conventional system 1 shown in FIG. 1 as compared to the exemplary embodiment of the system 100 shown in FIG. 2. As shown in FIG. 3, the PLC and the additional second set of sensors 33 may be eliminated along with the communication links for the non-existent eliminated PLC 25 and sensors 33. The elimination of the PLC 25 also eliminates the need for monitoring between the PLC 25 and controller thereby enabling the elimination of the communication links over which the monitoring occurred.

Figure 4:
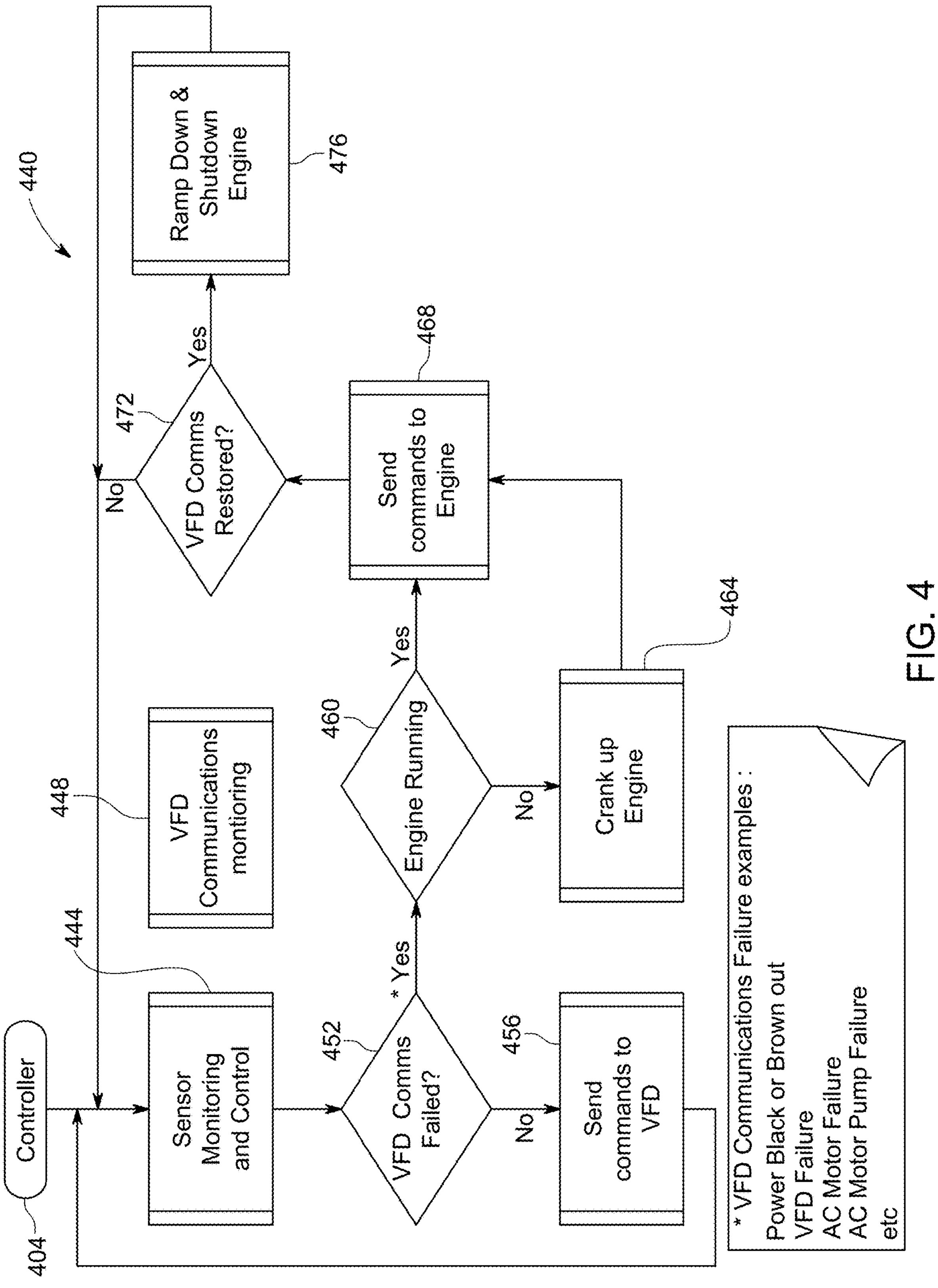
FIG. 4 illustrates an example failover operation from a motor (e.g., three-phase AC motor, etc.) to an engine (e.g., a diesel engine, etc.) in response to a VFD communications failure.

FIG. 4 illustrates an example failover operation or method 440 performed by a controller 404 from a motor (e.g., three-phase AC motor, etc.) to an engine (e.g., a diesel engine, etc.) in response to a VFD communications failure. The VFD communications failure may be caused by a power blackout, power brownout, VFD failure, AC motor failure, AC motor pump failure, etc.

As shown in FIG. 4, the method 440 includes sensor mounting and control at 444 and VFD communications monitoring at 448. If it is determined at 452 that VFD have not failed, then the controller 404 may send commands to the VFD at 456. But if it is determined at 452 that VFD communications have failed, then the method 440 proceeds to 460 at which it is determined whether or not the engine is running. If it is determined at 460 that the engine is not running, then method 440 includes starting or cranking up the engine at 464. When the engine is running, the controller 404 may then commands to the engine at 468.

At 472, a determination is made whether VFD communications have been restored. If VFD communications have been restored, then the method 440 proceeds to 476 at which the engine is ramped down and shutdown. But if it is determined at 472 that VFD communications have not been restored, then the method 440 proceeds back to sensor monitoring 444 and restarts.

Figure 5:
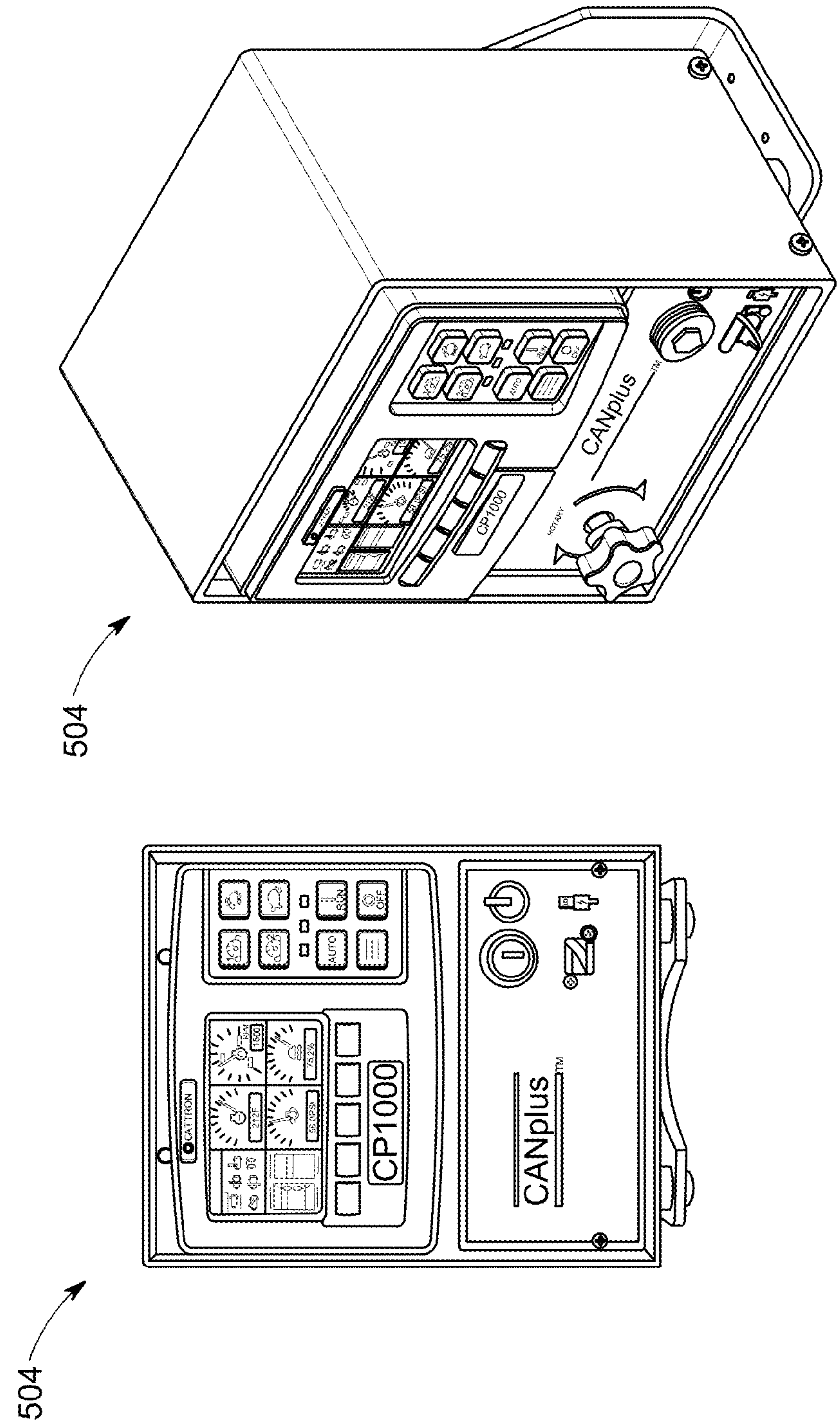
FIG. 5 shows an example CANplus™ CP1000 control panel that may be configured (e.g., algorithmically configured via an algorithm, provided with application programming or software, etc.) to be operable for controlling a VFD and an engine and with engine failover in response to a VFD communications failure.

By way of example, a controller disclosed herein (e.g., controller 104, controller 404, etc.) may comprise a CANplus™ CP1000 control panel 504 (FIG. 5) that is configured (e.g., algorithmically configured via an algorithm, provided with application programming or software, etc.) to be operable for controlling a VFD and an engine and with engine failover in response to a VFD communications failure.

In exemplary embodiments, a system includes a controller, a first pump, a second pump, a motor configured to be operable for driving the first pump, a variable frequency drive (VFD) configured to be operable for controlling a speed of the motor, and an engine configured to be operable for driving the second pump. The controller is configured to be operable for controlling the variable frequency drive and for controlling the engine. The controller is further configured to monitor VFD communications and to failover from the motor to the engine when the VFD communications as monitored by the controller indicate a failure in and/or loss of communication with the variable frequency drive.

In exemplary embodiments, the controller is also configured to failover automatically and substantially instantaneously from the motor to the engine when the VFD communications as monitored by the controller indicate a failure in and/or loss of communication with the variable frequency drive.

In exemplary embodiments, the controller is configured to failover from the motor to the engine in response to a VFD communications failure from a power blackout, a power brownout, a VFD failure, a motor failure, and/or a motor pump failure.

In exemplary embodiments, the controller is configured to failover from the motor to the engine when the variable frequency drive stops communicating with the controller due to a power loss, a hardware failure and/or a software failure that causes the variable frequency drive to stop communicating with the controller.

In exemplary embodiments, the variable frequency drive is configured to allow the controller to monitor or access operational information of the motor. The controller is configured to failover from the motor to the engine when the operational information of the motor as monitored or accessed by the controller indicates a failure in the operation of the motor.

In exemplary embodiments, the variable frequency drive is configured to allow the controller to monitor or access the amount of power being consumed by the motor. The is configured to failover from the motor to the engine when the amount of power consumed by the motor falls to zero.

In exemplary embodiments, the variable frequency drive is configured to allow the controller to monitor or access the amount of power being consumed by the motor and the motor's RPM. The controller is configured to failover from the motor to the engine when the amount of power consumed by the motor reaches or exceeds a predetermined maximum threshold and the motor's RPM reaches or falls below a predetermined minimum threshold.

In exemplary embodiments, the motor is a three-phase AC motor operable for mechanically spinning the first pump; and/or the engine is a diesel engine operable for mechanically spinning the second pump.

In exemplary embodiments, the variable frequency drive is configured to be operable for manipulating a frequency of an output by rectifying an incoming AC current into DC, and then using voltage pulse-width modulation (PWM) to recreate an AC current and voltage output waveform.

In exemplary embodiments, a method includes monitoring, via a controller, communications with a variable frequency drive (VFD) and failing over from the motor to the engine when the VFD communications as monitored by the controller indicate a failure in and/or loss of communication with the variable frequency drive. The controller is configured to be operable for controlling the variable frequency drive (VFD) and an engine. The variable frequency drive is configured to be operable for controlling a speed of a motor operable for driving a first pump. The engine is configured to be operable for driving a second pump.

In exemplary embodiments, the method includes the controller automatically and substantially instantaneously failing over from the motor to the engine when the VFD communications as monitored by the controller indicate a failure in and/or loss of communication with the variable frequency drive.

In exemplary embodiments, the method includes the controller failing over from the motor to the engine in response to a VFD communications failure from a power blackout, a power brownout, a VFD failure, a motor failure, and/or a motor pump failure.

In exemplary embodiments, the method includes the controller failing over from the motor to the engine when the variable frequency drive stops communicating with the controller due to a power loss, a hardware failure and/or a software failure that causes the variable frequency drive to stop communicating with the controller.

In exemplary embodiments, the method includes the controller monitoring or accessing operational information of the motor; and the controller failing over from the motor to the engine when the operational information of the motor as monitored or accessed by the controller indicates a failure in the operation of the motor.

In exemplary embodiments, the method includes the controller monitoring or accessing the amount of power being consumed by the motor; and the controller failing over from the motor to the engine when the amount of power consumed by the motor falls to zero.

In exemplary embodiments, the method includes the controller monitoring or accessing the amount of power being consumed by the motor and the motor's RPM; and the controller failing over from the motor to the engine when the amount of power consumed by the motor reaches or exceeds a predetermined maximum threshold and the motor's RPM reaches or falls below a predetermined minimum threshold.

In exemplary embodiments, the method includes using the same controller to control operation of both the variable frequency drive (VFD) and the engine.

In exemplary embodiments, a non-transitory computer-readable storage media includes executable instructions, such that when executed by at least one processor: communications with a variable frequency drive (VFD) are monitored by a controller; and when the VFD communications as monitored by the controller indicate a failure in and/or loss of communication with the variable frequency drive, the controller fails over from the motor to the engine. The controller is configured to be operable for controlling the variable frequency drive (VFD) and an engine. The variable frequency drive is configured to be operable for controlling a speed of a motor operable for driving a first pump. The engine is configured to be operable for driving a second pump.

In exemplary embodiments, the executable instructions include executable instructions that when executed by the at least one processor, the controller automatically and substantially instantaneously fails over from the motor to the engine when the VFD communications as monitored by the controller indicate a failure in and/or loss of communication with the variable frequency drive.

In exemplary embodiments, the executable instructions include executable instructions that when executed by the at least one processor: the controller monitors or accesses operational information of the motor; and the controller fails over from the motor to the engine when the operational information of the motor as monitored or accessed by the controller indicates a failure in the operation of the motor.

In exemplary embodiments, the executable instructions include the executable instructions include executable instructions that when executed by the at least one processor: the controller monitors or accesses the amount of power being consumed by the motor; and the controller fails over from the motor to the engine when the amount of power consumed by the motor falls to zero.

In exemplary embodiments, the executable instructions include executable instructions that when executed by the at least one processor: the controller monitors or accesses the amount of power being consumed by the motor and the motor's RPM; and the controller fails over from the motor to the engine when the amount of power consumed by the motor reaches or exceeds a predetermined maximum threshold and the motor's RPM reaches or falls below a predetermined minimum threshold.

The exemplary embodiments of the controllers disclosed herein (e.g., controller 104 (FIG. 2), controller 404 (FIG. 4), etc.) may be used in various types of systems, including water supply systems, wastewater systems (e.g., a sewer system bypass, sewer lift station, etc.), flood water management systems, etc. But the exemplary controllers disclosed herein may also be used in other systems and are not limited to use in any one particular type of system.

As will be appreciated based on the foregoing specification, the above-described embodiments of the disclosure may be implemented using computer programming or engineering techniques including computer software, firmware, hardware, or any combination or subset thereof, wherein the technical effect may be achieved by performing the following operations: monitoring communications with a variable frequency drive (VFD); and failing over from a motor to an engine when the VFD communications indicate a failure in and/or loss of communication with the variable frequency drive.

Exemplary embodiments may include one or more processors and memory coupled to (and in communication with) the one or more processors. A processor may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

It should be appreciated that the functions described herein, in some embodiments, may be described in computer executable instructions stored on a computer readable media, and executable by at least one processor. The computer readable media is a non-transitory computer readable storage medium. By way of example, and not limitation, such computer-readable media can include dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, other optical disk storage, magnetic disk storage or other magnetic storage devices, any other type of volatile or nonvolatile physical or tangible computer-readable media, or other medium that can be used to carry or store desired program code in the form of instructions or data structures and that can be accessed by a computer. Combinations of the above should also be included within the scope of computer-readable media.

Computer-executable instructions may be stored in the memory for execution by a processor to particularly cause the processor to perform one or more of the functions described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the functions or processes described herein.

It should also be appreciated that one or more aspects of the present disclosure transform a general-purpose computing device into a special-purpose computing device when configured to perform the functions, methods, and/or processes described herein.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The term "about" when applied to values indicates that the calculation or the measurement allows some slight imprecision in the value (with some approach to exactness in the value; approximately or reasonably close to the value;

nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
- a first pump;
- a second pump;
- a motor configured to be operable for driving the first pump;
- a variable frequency drive (VFD) configured to be operable for controlling a speed of the motor;
- an engine configured to be operable for driving the second pump; and
- a controller configured to be operable for controlling the variable frequency drive and for controlling the engine, the controller further configured to monitor VFD communications;
- wherein:
  - the variable frequency drive is configured to allow the controller to monitor or access the amount of power being consumed by the motor and the motor's RPM; and
  - the controller is configured to failover from the motor to the engine when the amount of power consumed by the motor reaches or exceeds a predetermined maximum threshold and the motor's RPM reaches or falls below a predetermined minimum threshold.

2. The system of claim 1, wherein the controller is also configured to failover automatically and substantially instantaneously from the motor to the engine when the VFD communications as monitored by the controller indicate a failure in and/or loss of communication with the variable frequency drive.

3. The system of claim 1, wherein the controller is configured to failover from the motor to the engine in response to a VFD communications failure from a power blackout, a power brownout, a VFD failure, a motor failure, and/or a motor pump failure.

4. The system of claim 1, wherein the controller is configured to failover from the motor to the engine when the variable frequency drive stops communicating with the controller due to a power loss, a hardware failure and/or a software failure that causes the variable frequency drive to stop communicating with the controller.

5. The system of claim 1, wherein:
- the variable frequency drive is configured to allow the controller to monitor or access operational information of the motor; and
- the controller is configured to failover from the motor to the engine when the operational information of the motor as monitored or accessed by the controller indicates a failure in the operation of the motor.

6. The system of claim 1, wherein:
- the variable frequency drive is configured to allow the controller to monitor or access the amount of power being consumed by the motor; and
- the controller is configured to failover from the motor to the engine when the amount of power consumed by the motor falls to zero.

7. The system of claim 1, wherein the controller is configured to failover from the motor to the engine when the VFD communications as monitored by the controller indicate a failure in and/or loss of communication with the variable frequency drive.

8. The system of claim 1, wherein:

the motor is a three-phase AC motor operable for mechanically spinning the first pump; and/or the engine is a diesel engine operable for mechanically spinning the second pump.

9. The system of claim 1, wherein the variable frequency drive is configured to be operable for manipulating a frequency of an output by rectifying an incoming AC current into DC, and then using voltage pulse-width modulation (PWM) to recreate an AC current and voltage output waveform.

10. A method comprising:

monitoring, via a controller, communications with a variable frequency drive (VFD), the controller configured to be operable for controlling the variable frequency drive (VFD) and an engine, the variable frequency drive configured to be operable for controlling a speed of a motor operable for driving a first pump, the engine configured to be operable for driving a second pump; and the controller monitoring or accessing the amount of power being consumed by the motor and the motor's RPM; and the controller failing over from the motor to the engine when the amount of power consumed by the motor reaches or exceeds a predetermined maximum threshold and the motor's RPM reaches or falls below a predetermined minimum threshold.

11. The method of claim 10, wherein the method includes the controller automatically and substantially instantaneously failing over from the motor to the engine when the VFD communications as monitored by the controller indicate a failure in and/or loss of communication with the variable frequency drive.

12. The method of claim 10, wherein the method includes the controller failing over from the motor to the engine in response to a VFD communications failure from a power blackout, a power brownout, a VFD failure, a motor failure, and/or a motor pump failure.

13. The method of claim 10, wherein the method includes the controller failing over from the motor to the engine when the variable frequency drive stops communicating with the controller due to a power loss, a hardware failure and/or a software failure that causes the variable frequency drive to stop communicating with the controller.

14. The method of claim 10, wherein the method includes:

the controller monitoring or accessing operational information of the motor; and the controller failing over from the motor to the engine when the operational information of the motor as monitored or accessed by the controller indicates a failure in the operation of the motor.

15. The method of claim 10, wherein the method includes:

the controller monitoring or accessing the amount of power being consumed by the motor; and the controller failing over from the motor to the engine when the amount of power consumed by the motor falls to zero.

16. The method of claim 10, wherein the method includes failing over from the motor to the engine when the VFD communications as monitored by the controller indicate a failure in and/or loss of communication with the variable frequency drive.

17. The method of claim 10, wherein the method includes using the same controller to control operation of both the variable frequency drive (VFD) and the engine.

18. A non-transitory computer-readable storage media including executable instructions, such that when executed by at least one processor:

communications with a variable frequency drive (VFD) are monitored by a controller, the controller configured to be operable for controlling the variable frequency drive (VFD) and an engine, the variable frequency drive configured to be operable for controlling a speed of a motor operable for driving a first pump, the engine configured to be operable for driving a second pump; and the controller monitors or accesses the amount of power being consumed by the motor and the motor's RPM; and the controller fails over from the motor to the engine when the amount of power consumed by the motor reaches or exceeds a predetermined maximum threshold and the motor's RPM reaches or falls below a predetermined minimum threshold.

19. The non-transitory computer-readable storage media of claim 18, wherein the executable instructions include executable instructions that when executed by the at least one processor, the controller automatically and substantially instantaneously fails over from the motor to the engine when the VFD communications as monitored by the controller indicate a failure in and/or loss of communication with the variable frequency drive.

20. The non-transitory computer-readable storage media of claim 18, wherein the executable instructions include executable instructions that when executed by the at least one processor:

the controller monitors or accesses operational information of the motor; and the controller fails over from the motor to the engine when the operational information of the motor as monitored or accessed by the controller indicates a failure in the operation of the motor.

21. The non-transitory computer-readable storage media of claim 18, wherein the executable instructions include executable instructions that when executed by the at least one processor:

the controller monitors or accesses the amount of power being consumed by the motor; and the controller fails over from the motor to the engine when the amount of power consumed by the motor falls to zero.

22. The non-transitory computer-readable storage media of claim 18, wherein the executable instructions include executable instructions that when executed by the at least one processor:

the controller fails over from the motor to the engine when the VFD communications as monitored by the controller indicate a failure in and/or loss of communication with the variable frequency drive.

* * * * *